(12) United States Patent  (10) Patent No.: US 7,866,735 B2
Theener  (45) Date of Patent: Jan. 11, 2011

(54) CURBSIDE LOADER AND UNLOADER

(76) Inventor: Mark Ernest Theener, 1905 N. Aronmink Way, Meridian, ID (US) 83646

( * ) Notice: Subject to any disclaimer, the term of this patent is extended or adjusted under 35 U.S.C. 154(b) by 150 days.

(21) Appl. No.: 12/365,602

(22) Filed: Feb. 4, 2009

(65) Prior Publication Data
US 2009/0134664 A1  May 28, 2009

Related U.S. Application Data

(63) Continuation-in-part of application No. 11/656,034, filed on Apr. 5, 2007, now abandoned.

(51) Int. Cl.
B62D 33/02  (2006.01)
(52) U.S. Cl. ................................... 296/183.2
(58) Field of Classification Search ............ 296/183.2, 296/182.1, 50, 57.1, 26.11, 26.08, 100.07, 296/183.1, 37.6, 39.2; 224/403, 404; 410/106
See application file for complete search history.

(56) References Cited

U.S. PATENT DOCUMENTS

| | | | | |
|---|---|---|---|---|
| 1,812,915 A | * | 7/1931 | Wright | 298/17.7 |
| 1,965,476 A | * | 7/1934 | Smith | 298/38 |
| 4,076,310 A | * | 2/1978 | Schwalm | 296/57.1 |
| 4,087,129 A | * | 5/1978 | Maxey | 298/18 |
| 4,268,084 A | * | 5/1981 | Peters | 296/148 |
| 4,619,484 A | * | 10/1986 | Maxey | 298/18 |
| 4,872,801 A | * | 10/1989 | Yeazel et al. | 414/409 |
| 5,551,824 A | * | 9/1996 | Zanzig et al. | 414/408 |
| 5,785,487 A | * | 7/1998 | McNeilus et al. | 414/517 |
| 5,906,417 A | * | 5/1999 | Golden | 296/183.2 |
| 6,056,368 A | * | 5/2000 | Rogers | 298/18 |
| 6,077,020 A | * | 6/2000 | Neufeldt et al. | 414/399 |
| 6,089,670 A | * | 7/2000 | Rogers | 298/11 |
| 6,206,477 B1 | * | 3/2001 | Rexus et al. | 298/23 MD |
| 6,382,731 B1 | * | 5/2002 | Slutz et al. | 298/22 R |
| 6,695,390 B2 | * | 2/2004 | Bucco Morello | 296/186.4 |
| 6,902,226 B1 | * | 6/2005 | Taylor | 296/182.1 |
| 6,953,316 B2 | * | 10/2005 | Neufeldt et al. | 414/525.6 |
| 2005/0088032 A1 | * | 4/2005 | Anemone et al. | 298/18 |

* cited by examiner

Primary Examiner—Kiran B. Patel
(74) Attorney, Agent, or Firm—Scott D. Swanson; Stephen M. Nipper; Dykas & Shaver LLP

(57) ABSTRACT

A bed has been provided for use with a vehicle in which the bed has a side loading apparatus and an opposite opening side wall through which material can be dumped from the bed.

7 Claims, 4 Drawing Sheets

CURBSIDE LOADER AND UNLOADER

CROSS-REFERENCE TO RELATED APPLICATIONS

This application claims the priority date of the non-provisional application entitled Curb-side debris loader/unloader filed by Mark E. Theener on Apr. 5, 2007, with application Ser. No. 11/656,034, the disclosure of which is incorporated herein by reference.

FIELD OF THE INVENTION

The invention generally relates to an apparatus for loading and unloading debris from a vehicle bed, and more particularly to a vehicle bed having an apparatus for loading material into one side of the vehicle bed and an apparatus for unloading the material on the opposite side of the vehicle bed.

BACKGROUND OF THE INVENTION

Landscaping is a very large industry both in the United States as well as abroad. Landscapers are often required to transport materials to and from a landscaping location as well as transport machinery to and from a landscaping location. In order to accomplish these tasks, landscapers often use a variety of vehicles and trailers. Generally landscaping crews will place debris and other material from a landscaping site into a trailer or vehicle bed for subsequent disposal of the material. Traditionally vehicle beds have been designed to dump material out of the rear of the truck or out of either side of the truck. Additionally, landscaping crews may be required to transport materials including, but not limited to, bark chips, landscaping rock, or dirt to a landscaping site. Landscaping crews generally empty materials out of vehicle beds by opening a back door of the vehicle bed and generally tilting the vehicle bed such that the material dumps out through the open rear door of the bed. This can potentially lead to difficulty if the landscaping crew is using the vehicle to tow a trailer. If the crew dumps the material out of the bed while the trailer is attached to the vehicle, the material may dump onto the trailer. Consequently, the crew is required to detach the trailer prior to dumping material out of the bed. When a landscaping crew is required to frequently attach and detach a trailer in order to empty or load a vehicle bed, the crew generally spends time that could be spent accomplishing landscaping tasks detaching and attaching the trailer. Consequently the efficiency and overall profitability of the landscaping crew can be diminished as the landscaping crew is not able to maximize time spent working.

Landscaping crews can also be required to lift objects or dump other materials into the bed of the vehicle. This may require additional workers depending on the size and location of the materials as it may require more time and effort to dump the materials into the vehicle bed. While the task may require additional workers, the task may also require that the workers lift heavy or odd shaped objects above their head to place into the vehicle bed. This can lead to an increased number of injured workers and may lead to an increased number of workers' compensation claims for the injuries. Consequently the overall efficiency of the landscaping crew may be decreased as injured laborers are not able to work as efficiently as uninjured laborers. Some vehicles known in the art have attempted to solve this by providing for a rear lift gate or to let down a side of the bed to allow a worker or a forklift, a front end loader, or similar machine to load materials into the bed of the vehicle.

SUMMARY OF THE INVENTION

A side loading and side emptying bed for use with a vehicle has been provided comprising a platform configured to tilt towards a side to allow materials to dump out of the bed. The bed has a mechanism to tilt the platform, four sidewalls, including one sidewall configured to swing open when the platform tilts toward it to allow material in the bed to dump out of the bed, and a second sidewall having an extension attached to the sidewall such that the sidewall and extension are configured to rotate such that materials can be placed on the extension. Subsequently the second sidewall and extension can be rotated back to the original position to dump the material into the bed. A mechanism is also provided that rotates the second side wall and extension to load material into the extension and dump the material into the truck.

Either or both of the mechanisms to rotate the second sidewall and extension or to tilt the platform can comprise a hydraulic mechanism. Additionally, hinges can be used one or all of the first sidewall to swing open and shut, the extension to rotate, or the second sidewall to rotate. The extension can also comprise an L shape that rotates around the rotating sidewall either without the rotating sidewall rotating or when the rotating sidewall rotates. Additionally, a releasable mechanism can be positioned on the bed that when engaged can prevent the first sidewall from opening and closing when the bed is tilted. This allows the bed to tilt to adjust the distribution of the material in the bed without dumping the material out of the bed. The bed can also have a mechanism that prevents the extension from over rotating past a position in which material can be placed on the extension when the extension rotates around the second sidewall.

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
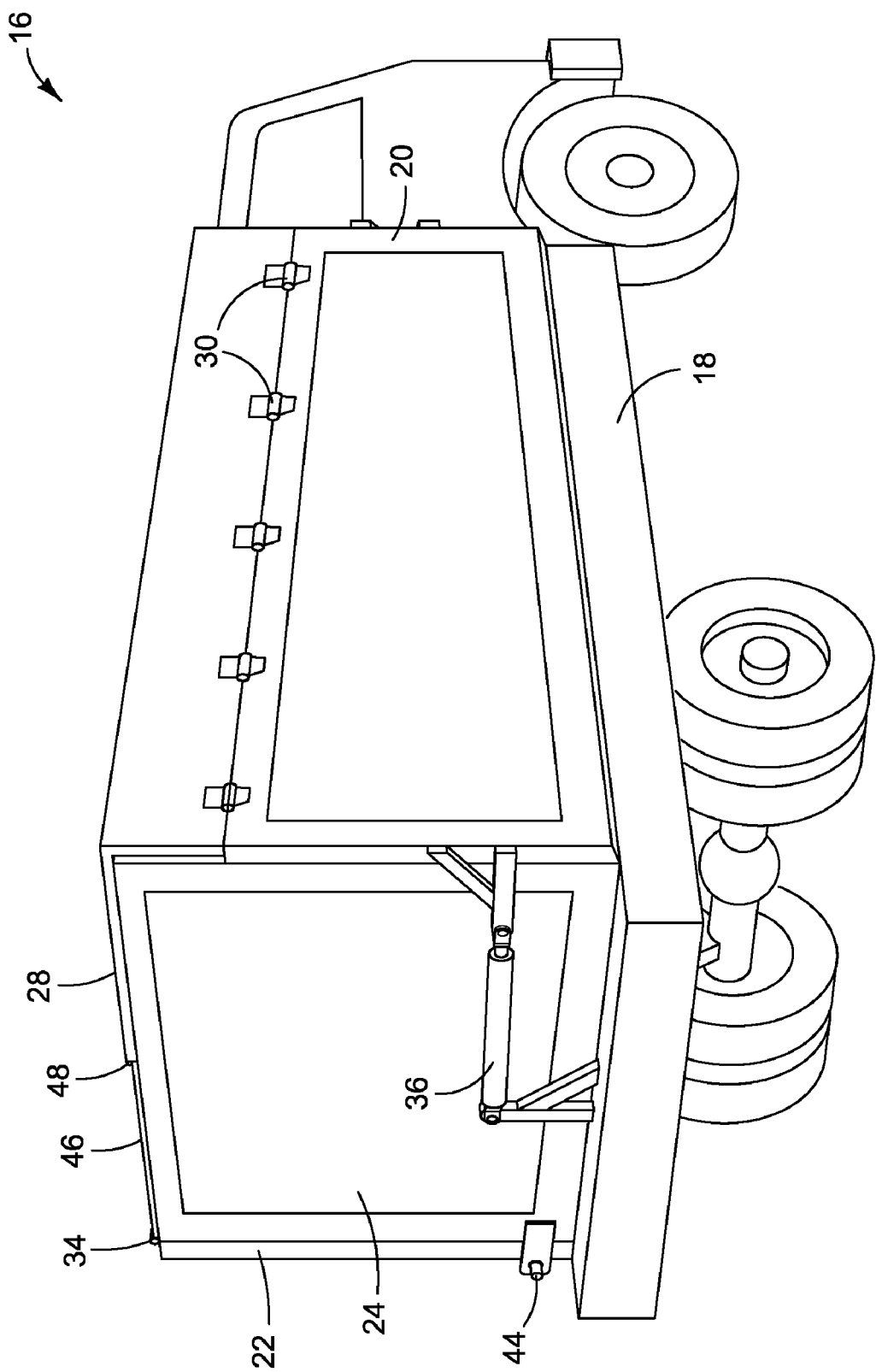
FIG. 1 is a perspective view of an embodiment of the vehicle bed attached to a vehicle.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Landscaping is a large industry. Landscapers frequently have to transport materials and other machinery to and from a landscaping site. Accordingly, landscapers must often use vehicles with loadable and unloadable beds and trailers to transport materials and objects to sites designated for landscaping work. The difficulty with this is that if a vehicle with an attached trailer is emptied from rear, it would be directly dumped onto the trailer. Additionally, workers can be required to lift heavy or awkward objects into the vehicle bed. This can lead to increased injuries to the workers, and decrease the efficiency of the landscaping crew.

Accordingly, a vehicle bed has been invented that is side loading and side unloading. The apparatus has been provided that allows workers to lift debris and objects into the vehicle bed without significant application of force as well as an apparatus to dump the material out of the side of the bed.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 illustrates a perspective view of a vehicle with an attached vehicle bed 16. The vehicle bed of the present invention can generally be configured to be mounted on a vehicle or the vehicle bed can be built as a component of the vehicle when the vehicle is assembled. The vehicle bed can be attached directly to the vehicle or the vehicle bed can include a sub frame that is attached directly to a vehicle and subsequently the vehicle bed is attached to the sub frame. Although the terms "debris", "materials", and "objects" are generally interchangeably used in this description to describe what can be placed into the vehicle bed, generally anything for transport that can fit into a vehicle bed can be placed in the vehicle bed. Generally, the vehicle bed can be made in a wide variety of sizes for accomplishing a wide variety of purposes or for placement on a wide variety of vehicles.

In the embodiment shown in FIG. 1, a platform 18 is provided with side walls 20, 22, 24, and 26. In this embodiment the right side wall 20 is attached to the platform 18 with piano hinges 32. Although piano hinges are generally used in the illustrated embodiment, the connection system for connecting the right side door to the platform can comprise any connection system known to those having ordinary skill in the art.

As illustrated, an extension 28 preferably is attached to the top of the right side door 20 with hinges 30. The extension 28 generally comprises an extension oriented and positioned such that when the extension and side wall 20 are rotated by the hydraulic system 36 around the piano hinges 32 towards the ground, debris can be placed onto the extension.

Figure 2:
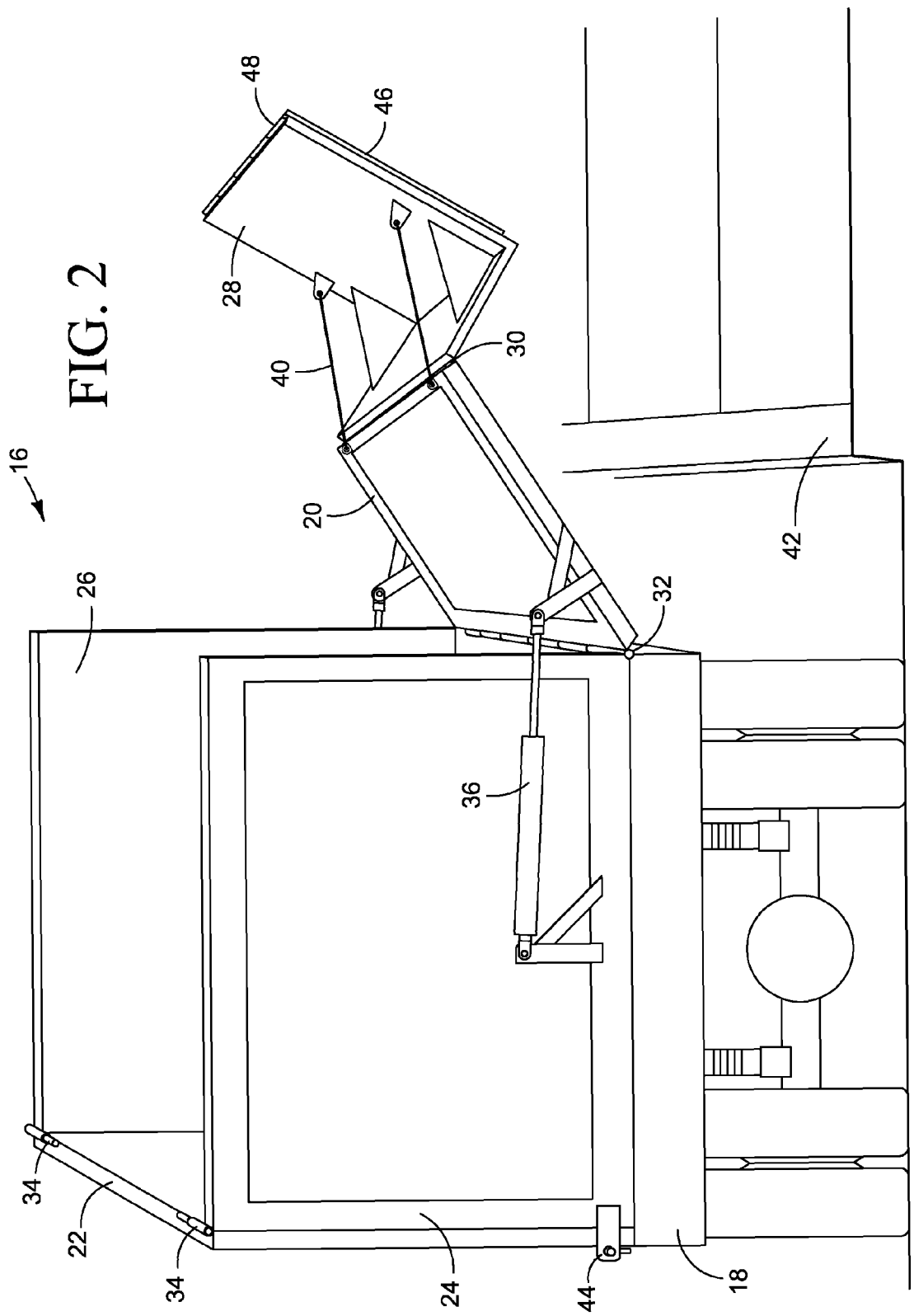
FIG. 2 is a rear perspective view of an embodiment of the vehicle bed attached to a vehicle illustrating the right side door extending to a curb.
Figure 3:
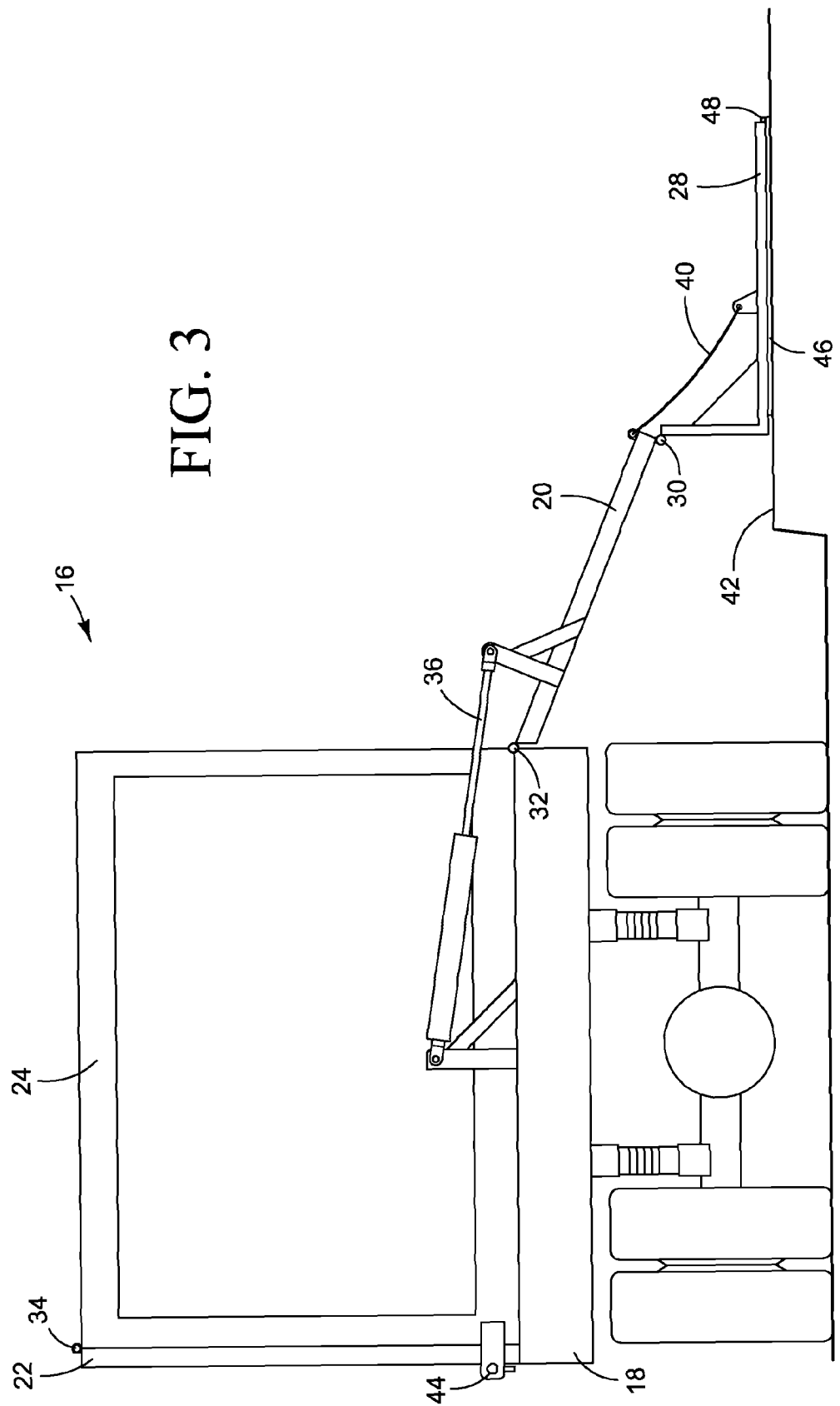
FIG. 3 is a rear side view of an embodiment of the vehicle bed attached to a vehicle illustrating the vehicle bed right side door and extension extended to a curb.

In the illustrated embodiment the extension is in an L shape such that material can be loaded onto the L shaped extension and dumped into the vehicle bed when the extension and side wall are rotated towards the closed position. In the illustrated embodiment, the hydraulic system 36 is configured to rotate the extension 28 and side wall 20 from a closed position (illustrated in FIG. 1), in which the right side wall forms a wall of the vehicle bed, to an open position (as illustrated in FIG. 2), in which the extension is generally resting on the ground (as illustrated in FIG. 3). Subsequently, the extension 28 and right side wall 20 can be rotated back to a closed position as illustrated in FIG. 1 by the hydraulic system 36.

The hydraulic system can be configured such that it has only two stopping locations, when the right side wall is open and when the right side is shut, or it can be configured such that a worker can stop the right side wall and extension from rotating at any point between the open position and the closed position. Subsequently, a worker can reverse the direction of the right side wall and extension to open or close the right side wall and extension or the worker can continue rotating the right side wall and extension in the previous direction. Also, as illustrated in FIG. 1, the vehicle bed has a chain or similar device attached to the extension and the right side wall for preventing the extension from fully rotating around the right side wall. Also as illustrated in FIG. 1 a releasable mechanism 44 is placed on the vehicle bed such that the left side door can be prevented from opening when the releasable mechanism is engaged. The mechanism can generally be a sliding pin and pin receptacle, a hook and loop system, or any other system generally known in the art.

A flap 46 is provided on the embodiment of the invention depicted in the drawings. The flap is oriented such that it is attached to the extension 28 so that when the flap is not in use it is folded over the extension. The flap can be used to cover a vehicle bed such that any material within the vehicle bed cannot fly out the top of the vehicle bed. In one embodiment, the flap is attached to the extension by hinges, for instance a piano hinge or any other hinge system that would function to attach the flap to the extension.

FIG. 2 illustrates the vehicle and vehicle bed in which the right side wall and extension are rotating towards a curb 42. This embodiment illustrates the hydraulic system 36 rotating the right side wall 20 and extension 28 towards the curb 42. The system 40 for preventing the extension from over rotating around the right side wall 20 is also illustrated. In the illustrated embodiment, the chain 40 attached to the right side wall 20 and serves to prevent the extension 28 from rotating beyond a position in which material can be placed on the extension. In this embodiment, when the right side wall 20 rotates towards the curb 42, the extension 28 rotates around the right side wall 20 such that the extension 28 is generally in a position where an operator can load debris into the extension 28. Also illustrated in FIG. 2 and FIG. 3 is the flap in a stored position wherein the flap is folded over the extension. In this manner the extension can be rotated and the flap will not be in the way of the workers. The flap, in one embodiment, can be tied down to or attached to the extension so that when it is a stored position, the flap does not come loose and interfere with the workers.

FIG. 3 illustrates a rear view of an embodiment of the vehicle and vehicle bed. In the illustrated position, the right side wall 20 is rotated around a platform 18 and the extension 28 is rotated around the right side wall 20 such that the extension 28 is positioned on the curb 42. In this position, an operator can load debris or other objects on to the extension. Subsequently, the hydraulic system 36 rotates the extension and right side wall back to a closed position in which the debris or material is dumped into the vehicle bed. Although in a preferred embodiment a hydraulic system is used to rotate the right side wall 20 and extension 28 from a closed position to the illustrated open position, generally any system know to those having skill in the art can be used. As illustrated in FIG. 3, when the flap is attached to the extension 28, the flap 46 is located in a position such that it is out of the way of workers. In this embodiment, the flap is located underneath the extension when the extension is positioned on a curb. In this position, materials can be loaded on the flap without the flap getting in the way of the materials or the workers. The extension can be lifted to be rotated such that the extension dumps the material on the extension into the bed of the truck without the flap getting in the way.

Figure 4:
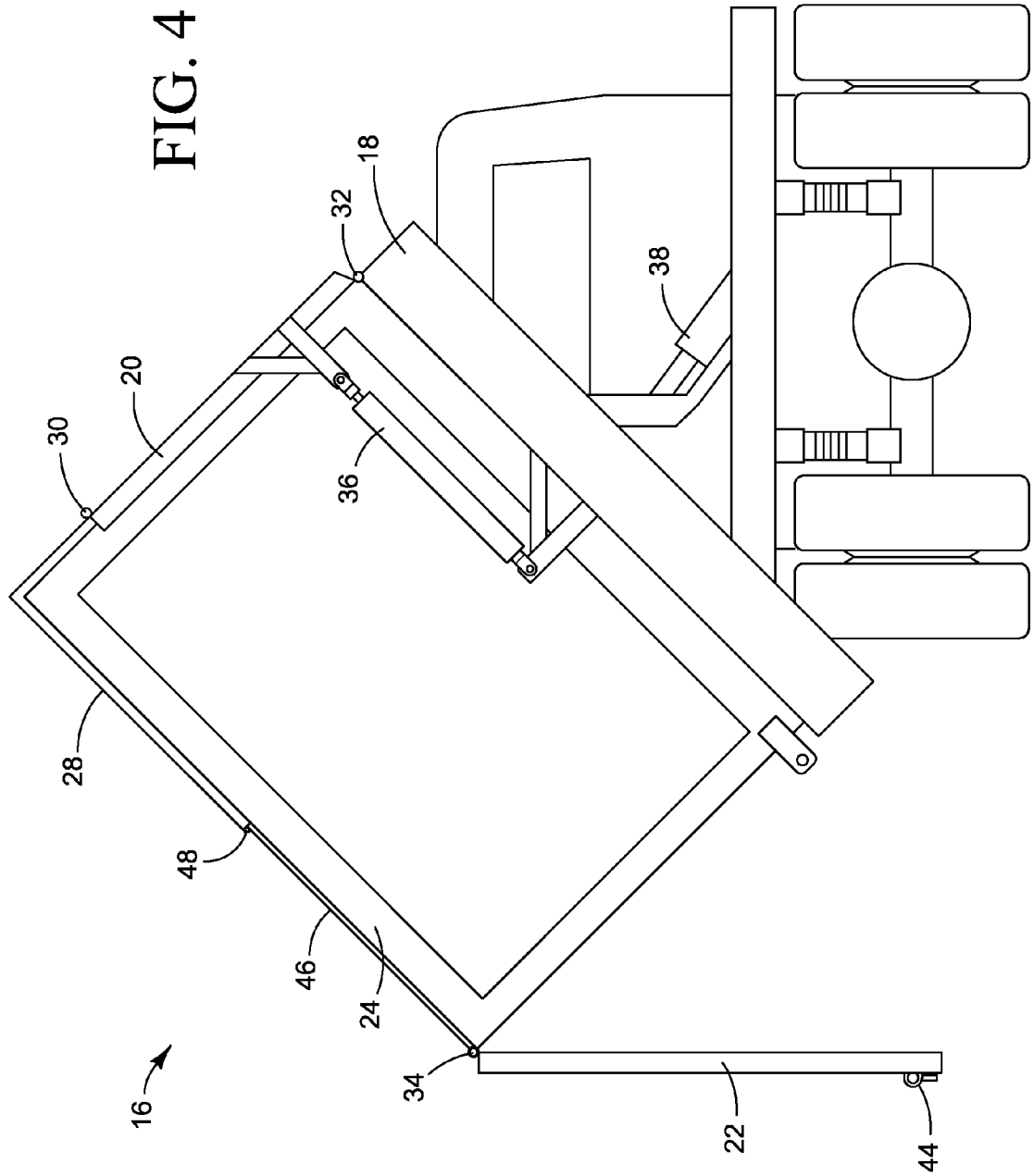
FIG. 4 is a second rear side view of an embodiment of the vehicle bed attached to a vehicle illustrating the vehicle bed in a tilted orientation such that the left side door is open.

FIG. 4 illustrates the vehicle and vehicle bed with the platform 18 tilted such that the left side door 22 swings on its hinges 24 and opens such that debris within the vehicle bed is dumped out of the bed. In FIG. 4, the right side door 20 and the extension 28 are also in a closed position. The system 38 for tilting the platform is also illustrated. This system can be a hydraulic system that includes, but is not limited to, a hydraulic lift or mechanical system that includes, but is not limited to, a mechanical lift. Additionally, any other system know in the art can be used for tilting the platform and returning the platform back to a horizontal orientation. Generally, but not expressly limited to the following, the system for tilting the platform can be connected either directly to the vehicle chassis of the vehicle or a sub frame can be mounted on the vehicle chassis to which the system for raising and lowering the system can be attached. It is also illustrated that the flap acts as a cover to the bed when the flap is in a non scored position. The flap can be tied down or attached to the vehicle beds such that it forms the attachment such that when the vehicle bed is tilted to empty materials from the vehicle bed, the flap does not fall out.

While there is shown and described the present preferred embodiment of the invention, it is to be distinctly understood that this invention is not limited thereto but may be variously embodied to practice within the scope of the following claims. For example, the bed can be designed to tip to either side or to the back of the vehicle bed. Additionally the loading mechanism can be designed to load from either side of the bed or from the back of the bed. From the foregoing description, it will be apparent that various changes may be made without departing from the spirit and scope of the invention as defined by the following claims.

What is claimed is:

1. A side loading and side emptying bed for use with a vehicle comprising:
   a platform, wherein said platform is attached to a vehicle, wherein said platform is configured to tilt from a generally horizontal orientation to a generally tilted orientation wherein a first side of said platform is lower than a second side of said platform;
   a tilting mechanism configured to tilt said platform;
   a first side wall, a second side wall, a front side wall, and a back side wall, wherein said side walls and said platform define a receptacle for receiving materials, wherein said first side wall is comprised of at least one member, wherein at least one of said members comprising a swinging member configured to swing open when said platform tilts toward said first side of said platform and to swing shut when said platform tilts toward said generally horizontal orientation, said second side wall comprising at least one member, wherein at least one of said members comprising a rotatable member, said rotatable member is attached to an extension, wherein said rotatable member and said extension are generally configured such that said rotatable member said extension rotate from a first closed position to a second position wherein material can be loaded onto said extension, wherein said extension and said rotatable member are configured to rotate back toward said first closed position and dump said materials onto said bed; and
   a rotating mechanism configured to rotate said rotatable member and said sidewall.

2. The side loading and side emptying vehicle bed of claim 1, wherein at least one of said tilting mechanism or said rotating mechanism comprising a hydraulic mechanism.

3. The side loading and side emptying vehicle bed of claim 1, wherein said swinging member comprising at least one hinge, wherein said hinge is configured to allow said swinging member to swing.

4. The side loading and side emptying vehicle bed of claim 1, wherein said extension is connected to said rotatable member by at least one hinge, wherein said hinge is configured to allow said extension to rotate.

5. The side loading and side emptying vehicle bed of claim 1, wherein said extension comprising an L shape, wherein said extension is configured to rotate around said rotatable member to a position to receive materials to be placed in said vehicle bed when said rotatable member rotates toward said open position.

6. The side loading and side emptying vehicle bed of claim 5 further comprising a mechanism configured to prevent said extension from rotating generally past said position wherein said extension is configured for loading of material.

7. The side loading and side emptying vehicle bed of claim 1, wherein said vehicle bed further comprises a releasable mechanism configured for preventing said swinging member from opening when said releasable system is engaged.

* * * * *